Sept. 22, 1964     R. B. GOODMAN     3,149,474
CONTROL SYSTEM FOR WATER BOILER
Filed May 16, 1963
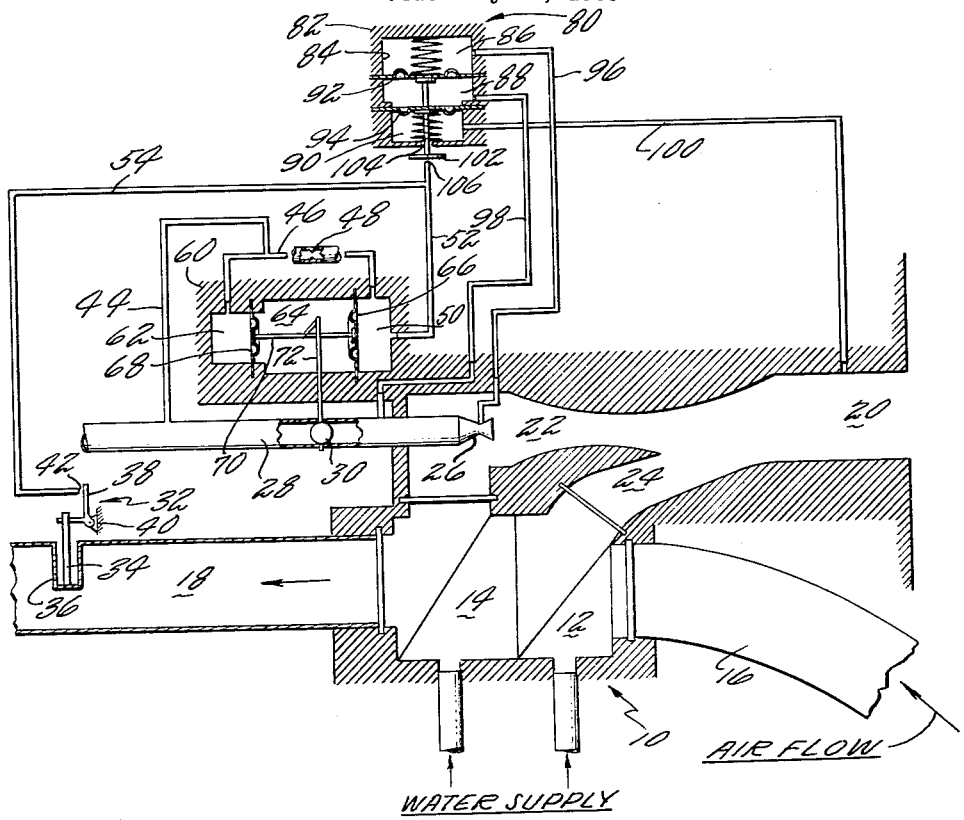
INVENTOR
ROBERT B. GOODMAN
BY Norman Friedland
ATTORNEY 3,149,474
CONTROL SYSTEM FOR WATER BOILER
Robert B. Goodman, Hartford, Conn., assignor to United Aircraft Corporation, East Hartford, Conn., a corporation of Delaware
Filed May 16, 1963, Ser. No. 280,962
5 Claims. (Cl. 62—170)

This invention relates to a control system and more particularly to a control system adapted to operate an ejector controlled boiler at optimum efficiency.

The present invention will describe for illustration purposes but understood not to be limited thereto, a two-stage water boiler system in combination with an ejector pump and a temperature control means therefor. In order to cool air or a fluid it is a well-known expedient to pass the air through a cooling medium such as water. The air having a temperature warmer than the boiling point of the water passes through the water boiling off the water and is discharged at substantially the water boiling temperature. The heat rejected by the air is absorbed by the water which is then turned into steam and vented from the water boiler.

The temperature of the air can be reduced to even a lower value by reducing the pressure in the water boiler. This can be accomplished by providing an ejector pump which, in effect, serves to reduce the pressure of the ambient air in the boiler. As the air is discharged from the ejector pump, it changes the static pressure in the boiler to a dynamic pressure and, in essence, reduces the total pressure of the water boiler in a well-known manner.

In order to establish the desired temperature of the air being discharged by the water boiler, the ejector pump may be controlled as a function of this temperature for reducing the boiler pressure and hence the temperature as called for by the temperature sensor. This may be accomplished by controlling a valve for regulating the discharge flow through the ejector pump as a function of the temperature sensor. Hence, a duct temperature sensor error signal output positions the ejector bleed air valve. Therefore, when an increase in temperature of the air discharged from the water boiler is sensed as being above the set point of the temperature sensor, a signal controls an actuator for positioning the bleed air valve to open hence increasing the pressure ratio across the ejector and consequently, reducing the pressure of the water boiler below the original ambient pressure. Obviously, this, in turn, has the effect of lowering the water boiling temperature as mentioned above.

Due to the nature of the efficiency of operation of the ejector, when an optimum pressure ratio across the nozzle of the ejector pump exceeds a predetermined value, a rapid deterioration in ejector performance will be realized. I have found that this condition can be obviated by providing means to override the ejector temperature control system when this optimum pressure ratio is exceeded. This means includes a pressure ratio control which is adapted to override the temperature control signal.

It is therefore an object of this invention to provide means for limiting operation of an ejector pump for a water boiler to its optimum efficiency point.

It still is a further object of this invention to provide means for overriding a temperature control system for an ejector-operated water boiler system to obtain maximum efficiency of the ejector.

It still is a further object of this invention to provide in a system as described a pressure ratio device adapted to limit the pressure ratio across the ejector.

It still is a further object of this invention to provide means for limiting the pressure ratio across an ejector pump which is normally controlled by a valve by measuring the static pressure at the throat of the ejector and the intermediate pressure between the valve and the throat of said ejector.

Other features and advantages will be apparent from the specification and claims and from the accompanying drawings which illustrate an embodiment of the invention.

The figure is a schematic illustration of the present invention.

Referring now more particularly to the only figure, a two-stage water boiler system generally indicated by numeral 10 is shown to be comprised of first water boiler 12 and second water boiler 14. Air to be cooled is conducted to the water boilers through duct 16 and is discharged at a reduced temperature at discharge duct 18. Steam is discharged from the water boiler through the discharge duct 20 communicating with branch vent lines 22 and 24.

As shown in this drawing, an ejector pump generally illustrated by numeral 26 is centrally disposed in branch vent line 22 and serves to reduce the pressure and hence the boiling temperature in the boilers. High temperature and pressurized fluid is conveyed to the ejector pump through conduit 28 connected to a high pressure source which may be, for example, compressor discharge bleed air from a turbo-type power plant (not shown). The amount of fluid admitted to the ejector pump is controlled by throttling of valve 30 which may take any suitable form such as a butterfly valve as illustrated. A servo control actuator responding to the temperature sensor illustrated by numeral 32 positions the throttle valve 30 as a function of temperature in order to maintain the discharge temperature evidenced in line 18 at a predetermined value.

The temperature sensor may be comprised of a bimetallic element consisting of a casing member 36 and a rod 34 which projects into duct 18. The bimetallic element may be of the type that expands and contracts and may be attached to bell crank lever 38 which rotates about pivot 40 for adjusting the discharge area of nozzle 42. Pressurized servo fluid is conducted from upstream of valve 30 from line 28 through line 44 into branch line 46 through fixed restriction 48 into chamber 50 through line 52 and line 54. The relative position of the end of crank 38 with respect to the discharge orifice 42 determines the pressure drop across the fixed restriction 48. As, for example, should the member 38 seat against discharged orifice 42, the pressure in chamber 50 will tend to increase. And conversely, if the member 38 is moved to its furthest position relative to nozzle 42, the pressure in chamber 50 will decrease owing to the fact that the flow through restriction increases, hence increasing the pressure drop thereacross.

As is noted from the drawing, the actuator for controlling the butterfly valve 30 comprises housing 60 which is subdivided into three chambers 62, 64 and 50. It will be noted that the diameter of chamber 62 is smaller than the diameter of chamber 50. Hence, diaphragms 66 and 68 mounted into the chambers as shown in the drawing are sized to extend across the walls of the three chambers to define volume expansion compartments. The relative size of these diaphragms is selected to define a multiple area servo actuator and preferably is a half-area servo. Since the effective area of the diaphragms are such that the area of diaphragm 68 equals one-half the area of diaphragm 66, when the pressure in chamber 50 equals one-half the pressure in chamber 62, the actuator becomes balanced and hence an equilibrium condition will be established. Assuming that the pressure in chamber 50 increases or decreases above or below the fifty percent value of chamber 62, the diaphragms will move either to the left or to the right depending on the direction of the change. Noting that the diaphragms carry a rigid rod member schematically illustrated as numeral 70 which, in turn, connects to a connecting shaft 72 so that the rectilinear motion of the rod member impacts a rotary motion to shaft 72 for rotating butterfly valve 30.

In operation, therefore, should the temperature of the discharge air in duct 18 increase, the bell crank 38 will be repositioned closer to discharge orifice or nozzle 42 for reducing its curtain area which, in turn, decreases the pressure drop across fixed restriction 48. This has the overall effect of increasing the pressure in chamber 50. Since this pressure acts over the larger area of the two diaphragms, a larger force is evidenced over the force created by the pressure acting over the smaller area of the diaphragms. Hence, rod member 70 and connecting shaft 72 cojointly cooperate to cause butterfly valve 30 to rotate for increasing the amount of flow to ejector pump 26. The increased flow through the ejector pump will tend to reduce the pressure in the boiler which, in turn, effectuates a reduction of the boiling temperature of the water in the water boilers so that the air passing therethrough will boil the water at a lower temperature. Consequently, the temperature of the discharge air will be reduced from the value that was evidenced prior to the change.

As was mentioned above, the efficiency of the ejector is dependent upon the pressure ratio thereacross. If the pressure ratio exceeds a maximum value, the efficiency of the ejector deteriorates rapidly. This condition is cured by the inclusion of my invention which comprises a ratio limiting control device generally indicated by numeral 80. The control device comprises a housing 82 defining a chamber 84 which is divided into three subchambers 86, 88 and 90. The chambers are separated by movable diaphragms 92 and 94. Fluid sensed at the throat of the ejector is fed to chamber 86 through line 96. Fluid intermediate the valve 30 and the throat of ejector pump 26 is fed to chamber 88 through line 98 and fluid in the discharge vent 20 is fed to chamber 90 through line 100. The relative forces acting over the chamber determine the pressure ratio limit which is selected to assure that the ejector pump will operate at its most efficient condition.

A flapper control valve 102 is connected to these diaphragms through rod 104 and controls the discharged vent 106 terminating at the end of line 52. Flapper 102 works similarly to the flapper described in connection with the discharged vent 42 and serves to further control the pressure in chamber 50. That is to say that when flapper 102 moves closer relative to nozzle 106, the pressure in chamber 50 will increase and when it is moved further away, the pressure in chamber 50 increases for further controlling the position of butterfly valve 30.

It is thus apparent from the foregoing that the pressure ratio limit control overrides the effect of the temperature control so that notwithstanding the requirement of the temperature control, the pressure ratio control has the effect of dictating the output of the ejector pump.

The operation of the pressure ratio control may be best described by illustrating the operation thereof through a mathematical explanation. For the sake of simplicity and convenience, the following letters and subscripts are used.

$P_t$ = Ejector nozzle throat pressure in pounds per square inch absolute (chamber 86)
$P_1$ = Ejector inlet pressure (chamber 88)
$P_a$ = Ambient pressure (chamber 90)
$A_L$ = The area of large diaphragm 92
$A_s$ = The area of small diaphragm 94

For a choked ejector nozzle the ratio $$\frac{P_t}{P_1} = \text{Const}$$

taking a force balance across the control diaphragm. (No net spring force, $F_s = 0$)

$$(P_1 - P_t)A_L = (P_1 - P_a)A_s$$

Divide both sides by $P_1 A_s$ the following results:

$$\left(1 - \frac{P_t}{P_1}\right)\frac{A_L}{A_s} = \left(1 - \frac{P_a}{P_1}\right)$$

Solving for $P_a/P_1$ the following results:

$$\frac{P_a}{P_1} = 1 - \left(1 - \frac{P_t}{P_1}\right)\frac{A_L}{A_s}$$

Taking the reciprocal of the equation in the above immediate equation and solving for $P_1/P_a$ the following results:

$$\frac{P_1}{P_a} = \frac{1}{1 - \left(1 - \frac{P_t}{P_1}\right)\frac{A_L}{A_s}}$$

Since $P_t/P_1 = \text{const}$, then the pressure ratio desired is determined by selecting the proper diaphragm area ratio. A variable pressure ratio schedule can be obtained by introducing a net spring force, $F_s \neq 0$.

$$(P_1 - P_t)A_L = (P_1 - P_a)A_s + F_s$$

Dividing both sides by $P_a A_s$:

$$\left(\frac{P_1}{P_a} - \frac{P_t}{P_a}\right)\frac{A_L}{A_s} = \left(\frac{P_1}{P_a} - 1\right) + \frac{F_s}{P_a A_s}$$

$$P_t = C P_1$$

$$\left(\frac{P_1}{P_a} - \frac{C P_1}{P_a}\right)\frac{A_L}{A_s} = \frac{P_1}{P_a} - 1 + \frac{F_s}{P_a A_s}$$

Factoring out $P_1/P_a$:

$$\frac{P_1}{P_a}\left[(1 - C)\frac{A_L}{A_s} - 1\right] = \frac{F_s}{P_a A_s} - 1$$

or $$\frac{P_1}{P_a} = \frac{F_s/P_a A_s - 1}{(1 - C)\frac{A_L}{A_s} - 1}$$

$$F_s/A_s = C_1$$

$$\frac{P_1}{P_a} = \frac{C_1/P_a - 1}{(1 - C)\frac{A_L}{A_s} - 1}$$

From the mathematical equations it can therefore be seen that the flapper valve 102 may be made to operate to control or override the temperature control when the desired pressure ratio has been reached. In this manner, therefore, when the ratio has reached this value, the control valve will be prevented from moving to an open position which otherwise would cause the efficiency of the ejector pump to deteriorate.

What has been shown by this invention is a relatively simple device which overrides a temperature control adapted to operate an ejector pump and limits operation of the ejector pump to its maximum efficiency point.

I claim:

1. A device for limiting to substantially the optimum efficiency point of the operation of an ejector adapted to lower the ambient pressure in a water boiler, throttling means for regulating the flow of fluid through said ejector, control means responsive to the fluid discharging from the water boiler for controlling said throttling means, means responsive to the pressure ratio across said ejector overriding said control means for further controlling said throttling means.

2. Apparatus for limiting to substantially the optimum efficiency point of the operation of an ejector comprising, in combination, a fluid conducting passage leading fluid to the ejector, valve means in said passage for regulating the flow of fluid therethrough, a water boiler having a discharge duct receiving the end of said fluid conducting passage, said water boiler also having another discharge duct, actuator means for varying the position of said valve means, means in said discharge duct responsive to the temperature of fluid flowing therein for controlling said actuator means, and means responsive to the pressure ratio across said ejector for further controlling said actuator means.

3. Apparatus for limiting to substantially the optimum efficiency point of the operation of an ejector adapted to lower the ambient pressure in a water boiler, a passage for leading fluid to said ejector, movable valve means in said passage for regulating the flow of fluid therein, actuator means for moving said valve means, means responsive to the temperature of the water boiler discharge fluid for controlling said actuator means, pressure ratio means for further controlling said actuator means, said pressure ratio means comprising a chamber defining a cavity portion, a pair of different area pressure responsive members mounted in said cavity portion for defining therewith three subcompartments, and connecting means for admitting fluid from said throat of the ejector to one of said subcompartments, from a point in said passage intermediate said valve means and said throat to another of said subcompartments and from said water boiler to the other of said subcompartments.

4. Apparatus for limiting the operation of an ejector adapted to lower the ambient pressure in a water boiler to substantially its optimum effiiciency point comprising, in combination, a fluid discharge duct connected to said water boiler, a temperature sensor mounted in said discharge duct, an actuator having a fluid servo pressure supply line means including a fixed restriction located between the actuator and temperature sensor, a first variable valve adjacent an opening in said fluid servo pressure supply line means and connected to said temperature sensor adapted to vary the pressure drop across said restriction, a pressure ratio sensor adapted to sense the ratio of the pressure across said ejector, a second variable valve adjacent another opening in said fluid servo pressure supply line means and connected to said ratio sensor and also adapted to vary the pressure drop across said restriction, said actuator being movable as a function of the value of said pressure drop.

5. Apparatus for limiting the operation of an ejector adapted to lower the ambient pressure in a water boiler to substantially its optimum efficiency point comprising, in combination, a casing having a cavity portion and a smaller diameter cavity portion, a pair of diaphragms having different effective areas extending across the walls of both of said cavity portions and defining therewith three compartments in juxtaposition relative to each other, a passage leading fluid to the ejector, a valve in said passage adjusting the flow of fluid, an actuator controlling said valve, fluid conducting means interconnecting each of said chambers with the throat of the ejector, the passage at a point intermediate the throat and the water boiler, and arranged so that the surface of the larger diaphragm is subjected to the pressure at the throat of the ejector, the opposite surface of the larger diaphragm and a surface of the smaller diaphragm is subjected to the pressure of the passage intermediate the throat and valve, and the opposite surface of said smaller diaphragm is subjected to pressure at the water boiler.

References Cited in the file of this patent
UNITED STATES PATENTS

| | | |
|---|---|---|
| 1,407,993 | Earl | Feb. 28, 1922 |
| 2,052,305 | Karr | Aug. 25, 1936 |
| 2,140,306 | Beals | Dec. 13, 1938 |
| 2,207,921 | Huxford | July 16, 1940 |
| 2,227,168 | Wexler | Dec. 31, 1940 |
| 2,252,368 | Germer | Aug. 12, 1941 |